(12) United States Patent
McCabe (10) Patent No.: US 8,337,706 B2
(45) Date of Patent: Dec. 25, 2012

(54) SOLIDS REMOVAL SYSTEM AND METHOD

(75) Inventor: Derald L. McCabe, Katy, TX (US)

(73) Assignee: 1612017 Alberta Ltd., Calgary (CA)

( * ) Notice: Subject to any disclaimer, the term of this patent is extended or adjusted under 35 U.S.C. 154(b) by 240 days.

(21) Appl. No.: 12/888,329

(22) Filed: Sep. 22, 2010

(65) Prior Publication Data

US 2011/0233144 A1 Sep. 29, 2011

Related U.S. Application Data

(63) Continuation-in-part of application No. 12/250,535, filed on Oct. 13, 2008, now abandoned.

(60) Provisional application No. 60/979,858, filed on Oct. 14, 2007.

(51) Int. Cl.
*B01D 21/02* (2006.01)
*B01D 17/028* (2006.01)
*C02F 1/463* (2006.01)
*C02F 1/52* (2006.01)

(52) U.S. Cl. .................... 210/702; 210/744; 210/748.01; 210/802; 210/104; 210/209; 210/521; 210/522; 210/534; 210/539; 210/540; 204/660; 204/602; 205/742; 205/743

(58) Field of Classification Search ................... 210/702, 210/703, 709, 744, 748.01, 801, 802, 104, 210/209, 218, 221.2, 243, 521, 522, 533, 210/534, 539, 540; 204/660, 602; 205/742, 205/743, 755

See application file for complete search history.

(56) References Cited

U.S. PATENT DOCUMENTS

| | | | |
|---|---|---|---|
| 349,990 A | 9/1886 | Gaillet et al. | |
| 1,176,775 A | 3/1916 | Morris | |
| 2,181,684 A | 11/1939 | Walker | |
| 2,261,101 A | 10/1941 | Erwin | |
| 2,570,304 A * | 10/1951 | Bach | 210/522 |
| 3,903,000 A | 9/1975 | Miura et al. | |
| 4,132,652 A | 1/1979 | Anderson et al. | |
| 4,324,656 A | 4/1982 | Godar | |
| 4,592,837 A | 6/1986 | Ludwig et al. | |

(Continued)

OTHER PUBLICATIONS

PCT (ISA/KR)—Notification of Transmittal of the International Search Report and the Written Opinion of the International Searching Authority regarding Applicant's counterpart PCT International Application No. PCT/US2008/079835; mailing date Jun. 4, 2009; 4 pages.

(Continued)

*Primary Examiner* — Christopher Upton
(74) *Attorney, Agent, or Firm* — Gordon G. Waggett, P.C.

(57) ABSTRACT

The present invention is directed to a method and apparatus for improved separation or clarification of solids from a solids-laden liquid. Entrained gasses can also be removed. A liquid to be treated is introduced into the inlet of a solid-liquid separator modified to include one or more sources of vibrational energy. The liquid to be treated is directed through a conduit within the separator. Preferably the conduit within the separator is configured into a tortuous flow path to assist in the separation of solids from the liquid. Vibrational energy is applied to the flow path, preferably through the flow path conduit. As solids fall out of solution, they are collected. The clarified liquid is also collected. A vacuum can be applied to the system to assist in moving the solid-liquid mixture through the system and to provide vacuum clarification. Electrocoagulation electrodes and gas sparging can also be employed.

36 Claims, 6 Drawing Sheets

U.S. PATENT DOCUMENTS

| | | | |
|---|---|---|---|
| 4,802,978 | A | 2/1989 | Schmit et al. |
| 4,816,146 | A | 3/1989 | Schertler |
| 5,700,378 | A | 12/1997 | Lee et al. |
| 5,741,426 | A | 4/1998 | McCabe et al. |
| 5,766,488 | A | 6/1998 | Uban et al. |
| 5,814,230 | A | 9/1998 | Willis et al. |
| 5,928,493 | A * | 7/1999 | Morkovsky et al. .......... 210/521 |
| 7,087,176 | B2 * | 8/2006 | Gavrel et al. ................. 210/243 |
| 7,186,347 | B2 | 3/2007 | Casey et al. |
| 2004/0129633 | A1 | 7/2004 | Edmundson |
| 2009/0095690 | A1 | 4/2009 | McCabe |

OTHER PUBLICATIONS

PCT (ISA/KR)—International Search Report in Applicant's counterpart PCT International Application No. PCT/US2008/079835; mailing date Jun. 4, 2009; 3 pages.

PCT (ISA/KR)—Written Opinion of the International Searching Authority in Applicant's counterpart PCT International Application No. PCT/US2008/079835; mailing date Jun. 4, 2009; 4 pages.

Ecologix Environmental Systems, "Stainless Steel Inclined Plate Clarifier", excerpt from ecologixsystems.com website. Printed Jun. 15, 2009.

Rock Services The Pump Man, "Fines Recovery Systems", 2 page excerpt from the rockservices.net website depicting the BRANDT "Hydro-Clear" Clarifier. Printed Jun. 15, 2009.

BRANDT (National Oilwell Varco) "Hydro-Clear" Clarifier, one page brochure (Best available copy) downloaded from the novstore.com website. Printed Jun. 15, 2009.

Mi Swaco, "Environmental Solutions" catalog Version 4, 2009 (136 pages broken out into 5 parts), downloaded Jun. 15, 2009 from the miswaco.com website. In part 5, pp. 136-137 there is a two page description of the Mi Swaco "Multi-Phase Clarifier (MPC)" for "produced water treatment".

Industrial Marketing Systems—3-page brochure from the imswe.com website regarding the "Graver" lamella clarifier. Printed Jun. 15, 2009.

Clearwater Industries—2-page brochure from the clearwaterind.com website regarding the Clearwater Model 3200 Rectangular Water Clarifier. Printed Jun. 15, 2009.

Monroe Environmental—2-page brochure from the monroeenvironmental.com website regarding Wastewater Clarifiers. Printed Jun. 15, 2009.

Monroe Environmental—2-page brochure from the monroeenvironmental.com website regarding the Monroe Compact Clarifier. Dated 2000. Printed Jun. 15, 2009.

Non-Final Office Action mailed Mar. 22, 2010 in parent U.S. Appl. No. 12/250,535 (7 pages).

* cited by examiner

SOLIDS REMOVAL SYSTEM AND METHOD

CROSS-REFERENCE TO RELATED APPLICATIONS

This application is a continuation-in-part of U.S. Nonprovisional patent application Ser. No. 12/250,535 filed Oct. 13, 2008 now abandoned, Confirmation No. 3961, which in turn claims the benefit of the filing date of and priority to U.S. Provisional Application Ser. No. 60/979,858 entitled "Solids Removal System and Method" and filed Oct. 14, 2007, Confirmation No. 8078. Said applications are incorporated by reference herein.

STATEMENT REGARDING FEDERALLY SPONSORED RESEARCH OR DEVELOPMENT

Not Applicable.

BACKGROUND OF THE INVENTION

The present invention is directed generally to a method and apparatus for removing solids from a solid-liquid mixture, as well as the removal of entrained gasses. Example solid-liquid mixtures include, e.g., drilling mud used in the oilfield industry, sewage, coal slurries, mining wastes, feed water for industrial applications, and other mixtures desired to be clarified. By way of one example, the method and apparatus of the present invention could be used alone or in combination with de-silters, de-sanders, de-gassers, shakers and shaker screens, and/or centrifuges used to treat drilling fluids in an oil field application.

BACKGROUND ART

As described in the Applicant's commonly owned U.S. Pat. No. 5,741,426, which is incorporated herein by reference in its entirety, there is described a method and apparatus for treatment of contaminated water, containing undesired solid, liquid, and/or gaseous materials which includes an electro-flocculation means for disassociating ions from the undesired solid material and from the contaminated water, and further includes a separation tower having various deflection means deflecting undesired solid materials downwardly through the separation tower.

The Applicant's U.S. Pat. No. 5,741,426 also teaches the use of an upward tortuous or serpentine flow path in a vacuum-assisted separator/clarifier to aid in the separation of solids from the solid-liquid mixture passing therethrough. As such, it would be desirable to further enhance the solids separation achieved from the solid-liquid mixtures passing through a separator of the type described in Applicant's U.S. Pat. No. 5,741,426. It would also be desirable to enhance the separation of the solids from the liquids present in other mechanical solid-liquid separation units.

BRIEF SUMMARY OF THE INVENTION

To address the forgoing desires, the present invention teaches the use of one or more sources of vibration to enhance the solid-liquid separation occurring in a solid-liquid separator system.

The present invention is directed to a method and apparatus for improved separation or clarification of solids from a solids-laden liquid. A liquid to be treated is introduced into the inlet of a solid-liquid separator modified to include one or more sources of vibrational energy. The liquid to be treated is directed through a conduit within the separator. Preferably the conduit within the separator is configured into a tortuous flow path to assist in the separation of solids from the liquid. Vibrational energy is applied to the flow path, preferably through the flow path conduit. As solids fall out of solution, they are collected. The clarified liquid is also collected. A vacuum can be applied to the system to assist in moving the solid-liquid mixture through the system and to provide vacuum clarification.

For example, the separator unit depicted in Applicant's U.S. Pat. No. 5,741,426 can be modified such that at least one source of vibration is applied to the separator thereby enhancing the separation of the solids from the solid-liquid mixture passing through the separator. Such source of vibration can be mounted on the exterior of the separator unit (or potentially within the unit) so that the vibration passes into the interior of the separator. For example, a vibrator motor could be mounted on the outside of the separator depicted in Applicant's U.S. Pat. No. 5,741,426 so that the vibration passes into the baffle/deflection plates forming the generally serpentine flow path. The vibration can be created by any available source, such as, mechanical, electrical, air-driven, or hydraulic-driven vibrator devices and/or by sonic waves, microwaves, or other source of vibration.

In one preferred embodiment, the solids elimination system of the present invention consists of a square, rectangular or round vertical vessel with slanted baffle plates designed to cause a tortuous flow path for the solids laden liquid inside of the vessel. The system preferably has a vacuum apparatus to provide a lowered pressure or vacuum inside the vessel. The lower pressure is regulated by a adjustable vacuum regulating valve located at the suction of the vacuum apparatus. Another apparatus is provided to remove the clean liquid (such as, drilling fluids) by means of a pump or other apparatus such as a liquid eductor. As the liquid phase is separated, the resulting solids laden slurry is removed by a mechanical means such as a pump, augur, dump valve or other means. The liquid level is controlled by float switch or other liquid level control devices and a motor control flow valve.

Solids laden fluids, such as drill mud with solids entrained, are pulled into the apparatus by means of the vacuum, through the inlet header located at the top of the first slant plate. In one preferred embodiment, the first slant plate is made of thick plate and has a vibrator motor attached to the bottom of the plate. A connecting rod can preferentially be attached to each deflector and to the vibrator motor to distribute the vibration. The vibrator motor can also be set on top of the vessel and connected to each plate by means of the connecting rod. The vibrator motor can also be installed on the side of the vessel thereby having contact with the shell and all the baffle plates. The vibration is designed to disturb the molecular bonding of the liquids and the vibration amplification can be controlled by means of a V.F.D. (variable frequency drive) or other apparatus to change the rotational speed of the motor (and hence the vibration intensity). If a air or hydraulic vibrator device is used, the amplification can be controlled through pressure regulation or valve arrangements. If electric or electronic vibration such as sonic or microwaves are used, the amplification can be adjusted by electronic means.

As the flow of solids laden liquid enters the inlet header it is directed downward across the first vibrating plate. The vibration applied to the bottom plate disturbs the molecular bond of the liquids and causes rapid settling of solid particulate matter. The downward flow along with the vibration pushes the particulates to the lower edge of the slant plate where it is then directed into a standoff conduit. The flow characteristics in the standoff conduit are such that the lack of flow does not keep the solid particulates entrained, but rather permits them to fall out to the bottom of the standoff conduit where they can be discharged for further handling, disposal or use as may be desired.

The flow of the solid-liquid mixture to be treated is directed upwardly through a tortuous path caused by the baffle arrangement. As the solids laden liquid moves upwards through this tortuous path, solids are separated and fall into the standoff conduit thereby repeating the process until all undesirable particulate is removed. Entrained gasses will also be released by the vibration and removed via the vacuum source.

There is described a vacuum assisted solid-liquid separation apparatus for treating contaminated liquids contaminated with undesired solids and gasses. In one embodiment, this apparatus has an enclosed separation tower having an upper end and a lower end opposite thereto, a longitudinal axis oriented substantially vertically through the upper end and the lower end, an outer wall, a top wall connected to the outer wall at the upper end and a bottom wall connected to the outer wall opposite the top wall, the outer wall having an inside surface and an outside surface. The tower interior space defined as the space within the outer wall, top wall and bottom wall. The apparatus is outfitted with a contaminated liquids inlet located proximate the vessel lower end for introducing the contaminated liquids into the tower interior space and a clarified liquids outlet located above the contaminated liquids inlet for discharging the clarified liquids to a desired location. A plurality of baffle plates are disposed in the tower interior space in a spaced apart relationship, with at least some of the baffle plates being angularly disposed with respect to the longitudinal axis of the separation tower to define a generally serpentine fluid flow passageway, the serpentine fluid passageway having a first end in fluid communication with the contaminated liquid inlet, and a second end in fluid communication with the clarified water outlet and the tower interior space proximate the upper end of the tower, the angular disposition of the plates creating a series of alternating downwardly and upwardly sloped flow segments within the serpentine first fluid path wherein the contaminated liquid generally flows downwardly in each of the downwardly sloped segments into a downward slope corner and upwardly in the upwardly sloped segment toward an upward slope upper corner.

One or more solids discharge ports are located in one or more of the downward slope corners. A standoff conduit is provided in fluid communication with the one or more solids discharge ports for receiving solids from the contaminated water through the one or more solids discharge ports, the standoff conduit having at its lower end a solids outlet port and its upper end being in fluid communication with the tower interior space. The apparatus also employs a vacuum inlet in fluid communication with the tower interior space and located above the clarified liquid outlet for pulling a vacuum on the tower interior space to urge contaminated liquid into the contaminated liquid inlet and up through the serpentine fluid flow passageway to the clarified liquid outlet; and one or more sources of vibrational energy applied to the separation apparatus.

The vibration energy sources are preferably created by mechanical, electrical, air-driven, or hydraulic-driven vibrator devices and/or by sonic waves, microwaves, or sources of vibration that provide for control of the amplification of the vibration by means of a variable frequency drive or other apparatus to change the intensity of the vibration. In one embodiment, a single source of vibrational energy is applied to the separation apparatus; in another, more than one source of vibrational energy is applied to the separation apparatus. The source of vibrational energy may be directed to the plurality of baffle plates. The source of vibrational energy can be located on the bottom, top and/or side of the tower.

In another embodiment, the solid-liquid separation apparatus further comprises a connecting rod extending from the lower end of the tower and upward through the plurality of baffle plates, the connecting rod having a first end located proximate one of the one or more vibrational energy sources and a second end terminating either within the tower interior space or extending into the tower upper end. The connecting rod second end can extend into the tower upper end and both ends of the connecting rod can receive a source of vibrational energy from the vibrational energy sources.

The solid-liquid separation apparatus tower can be substantially cylindrical, rectangular or square in shape.

In one embodiment, the standoff conduit is located within the tower. In another embodiment, the standoff conduit is located external to the tower.

The solid-liquid separation apparatus can further comprise an inlet control valve for controlling the flow of contaminated liquid through the contaminated liquids inlet, a clarified liquid outlet control valve for controlling the flow of clarified liquid through the clarified liquids outlet, a solids discharge control valve for controlling the flow of solids out of the standoff conduit and a liquid level control device for monitoring and controlling the liquid level in the tower. A process controller can be employed to monitor and coordinate the operation of the inlet control valve, the clarified liquid outlet control valve, the solids discharge control valve and/or the liquid level control device.

A pump can be connected with the solids outlet port to facilitate removal of received solids from the standoff conduit.

In one embodiment, of the solid-liquid separation apparatus, the angularly disposed baffle plates are angularly disposed with respect to the longitudinal axis of the separation tower between 1 and 45 degrees. In another embodiment, the angle is between 45 and 60 degrees.

In another embodiment, the separator device further comprises one or more electrocoagulation electrodes housed within the serpentine fluid passageway capable of discharging an electrical current into the fluid, wherein the electrodes are capable of alternating between a positive polarity and a negative polarity and are controlled by process control equipment.

There is also described a method of removing undesirable solids and gasses from liquid contaminants comprising the steps of: (a) directing solids laden liquids into the inlet of a vacuum assisted solid-liquid separation apparatus such as described herein for treating contaminated liquids contaminated with undesired solids and gasses; (b) applying at least one vibrational energy source to the separation apparatus; (c) applying a vacuum source at the vacuum inlet via the vacuum apparatus; (d) flowing the solids laden liquids from the inlet upwardly through the generally serpentine fluid flow passageway with the vacuum apparatus to cause undesired solid materials striking the baffle plates to be directed downwardly into the standoff conduit toward the lower end of the separation tower; (e) removing clarified liquid from the separation tower through the clarified water outlet; (f) removing undesired gasses out through the vacuum apparatus; and (g) removing undesired solids from the standoff conduit.

The method can further comprise steps of monitoring and coordinating the operation of the inlet control valve, the clarified liquid outlet control valve, the solids discharge control valve and/or the liquid level control device. The method can also include controlling the amplification or intensity of the vibration. In one embodiment of the method, the vibrational energy is directed to the serpentine flow pathway.

Where the separator device employs electrocoagulation electrodes, the method further comprises the step of introducing a current from the electrodes into the serpentine fluid passageway, and alternating the polarity of the electrodes between positive and negative polarity.

The solid-liquid separation apparatus may further comprise one or more gas spargers mounted within the serpentine fluid passageway in an area above the one or more solids discharge ports located in the one or more of the downward slope corners for introducing a sparge gas into the serpentine fluid pathway. The method would also include the step of introducing said sparge gas into the serpentine fluid pathway.

The solid-liquid separation apparatus may further comprise a chemical injection port for introducing into the serpentine fluid path one or more desired treatment chemicals, and the method would further comprise the step of introducing the one or more chemicals into the serpentine fluid pathway.

In another embodiment of the present disclosure, there is described a vacuum assisted solid-liquid separation apparatus for treating contaminated liquids contaminated with undesired solids and gasses, comprising: (a) an enclosed separation tower having an upper end and a lower end opposite thereto, a longitudinal axis oriented substantially vertically through the upper end and the lower end, an outer wall, a top wall connected to the outer wall at the upper end and a bottom wall connected to the outer wall opposite the top wall, the outer wall having an inside surface and an outside surface; (b) a tower interior space defined as the space within the outer wall, top wall and bottom wall; (c) a contaminated liquids inlet located proximate the vessel lower end for introducing the contaminated liquids into the tower interior space; (d) a clarified liquids outlet located above the contaminated liquids inlet for discharging the clarified liquids to a desired location; (e) a plurality of baffle plates disposed in the tower interior space in a spaced apart relationship, with at least some of the baffle plates being angularly disposed with respect to the longitudinal axis of the separation tower to define a generally serpentine fluid flow passageway, the serpentine fluid passageway having a first end in fluid communication with the contaminated liquid inlet, and a second end in fluid communication with the clarified water outlet and the tower interior space proximate the upper end of the tower, the angular disposition of the plates creating a series of alternating downwardly and upwardly sloped flow segments within the serpentine first fluid path wherein the contaminated liquid generally flows downwardly in each of the downwardly sloped segments into a downward slope corner and upwardly in the upwardly sloped segment toward an upward slope upper corner; (f) one or more solids discharge ports located in one or more of the downward slope corners; (g) a standoff conduit, having upper and lower ends, in fluid communication with the one or more solids discharge ports for receiving solids from the contaminated water through the one or more solids discharge ports, the standoff conduit having at its lower end a solids outlet port, and having its upper end in fluid communication with the tower interior space; (h) one or more upper discharge slots located in one or more of the upward slope upper corners; (i) a secondary standoff conduit, having upper and lower ends, in fluid communication with the one or more upper discharge slots for receiving gasses, oils, bubbles and other lighter materials from the contaminated liquids through the one or more upper discharge slots, the secondary standoff conduit having at its lower end a lower outlet for discharging accumulated solids, and having housed within its upper end an upper outlet coupled with a weir for receiving oil and discharging oil out the outlet into discharge tubing, the upper end of the secondary standoff conduit being in fluid communication with the tower interior space; (j) a vacuum inlet in fluid communication with the tower interior space and located above the clarified liquid outlet for pulling a vacuum on the tower interior space to urge contaminated liquid into the contaminated liquid inlet and up through the serpentine fluid flow passageway to the clarified liquid outlet; and (k) one or more sources of vibrational energy applied to the separation apparatus. In other embodiments, this device can employ electrocoagulation electrodes, gas sparging, and/or injection of one or more chemical additives.

DETAILED DESCRIPTION OF THE INVENTION

Reference is now made to the drawings which depict preferred embodiments of the present invention, but are not drawn to scale. Referring now to FIGS. 1-5, there are shown partial cross-sectional views of various separation tower 10 embodiments in accordance with the present invention for use in the treatment of solids laden water 14.

In a preferred embodiment, the separation tower 10 is oriented vertically along a longitudinal axis 13, and has an upper end 11 and a lower end 12. The vessel can be any general shape, but a preferred shape would be cylindrical or rectangular. The vessel construction is designed to be a closed system that can withstand the maximum pressure that can be pulled by a vacuum, e.g., approx. 29.92 inches of Mercury.

A source of contaminated liquid (e.g., a solids/gas laden liquid) 15 is conveyed in the inlet conduit 24 and introduced into the separator 10 via inlet 20. The inlet conduit is in fluid communication between the source of contaminated water (e.g., a holding tank) and the separator 10. Ideally, the flow rate of the mixture 15 flowing into the separator 10 is regulated by, e.g., an inlet motor control valve 22. As the solids laden liquid mixture 15 enters the separator 10, it flows downwardly along the first of a plurality of baffle plates (or slant plates or deflection plates) 40. Each plate 40 has an upper end 44 and a lower end 42 and is angularly disposed with respect to the longitudinal axis 13. Preferably, some of the baffle plates 40 slope downwardly toward the lower end 12 of the separator tower 10, whereby at least some of the baffle plates 40 define a generally serpentine fluid passageway or path 50 as shown by arrows 51 through which the contaminated water 15 flows. However, preferably all of the baffle plates 40 are angularly disposed as illustrated for baffle plates 40 in FIGS. 1-5. Preferably, baffle plates 40 are angularly disposed within a range of from 1 degree to 45 degrees with respect to the longitudinal axis 13 of tower 10. The angle can also preferably be between 45 and 60 degrees. The first plate 41 can also form the base or floor of the separator and is the first plate to receive waste stream 15 from the inlet 20. At the lower end 42 of alternating plates 40 is located a solids discharge port 60 located in the downward slope corner area 40c. The plurality of plates 40 are oriented generally parallel to each other. The plates 40 are mounted within the separator 10 in an alternating fashion such that the space created between them forms a serpentine-like flow path chamber 50 that directs the flow of contaminant stream 15 from the inlet 20 through the path 50 and eventually up to the outlet 30. The separator 10 has an outlet 30 for discharging clarified or treated water 36 through outlet conduit 34 to a desired location, such as, to be recycled into the system, be disposed, or used as desired by the operator. Preferably, the discharge of water through outlet 30 is regulated by a valve 32 that can be used in connection with a means of conveyance, such as, an eductor, pump or other suitable device known in the art to draw liquid from the outlet 30 to a desired location. As such, the lower portion of the separator 10 containing the plurality of plates 40 forces the solids-laden mixture to progress along the tortuous path 50 created by the juxtapositioning of the plates 40. It is to be understood that the invention is not limited to the exact details of construction, operation, exact materials or embodiment shown and described, as obvious modifications and equivalents will be apparent to one skilled in the art. For example, apparatus 10 could include some, or all of the components illustrated with apparatus 10, as well as the various deflection means may have other cross-sectional configurations than those illustrated.

Similar to the baffle structure depicted in connection with element 120 of U.S. Pat. No. 5,741,426, the separation tower 10 of the present invention is an enclosed structure with an interior space 98 capable of permitting a vacuum to be drawn upon such space. As such, the separation tower will generally have a top wall or ceiling 10a, a bottom wall or floor 10b, and one or more side walls 10c. The separator side wall 10c can be a singular cylindrical structure (such as where the separation tower is generally cylindrical in shape). If the separation tower is rectangular in shape, then the tower would have four side walls 10c-1, 10c-2, 10c-3 and 10c-4 (see FIG. 1B) generally forming the rectangular shape. Within the inside of the separation tower, the tower preferably includes a plurality of baffle plates 40 disposed in a spaced apart relationship, with at least some of the baffle plates 40 being angularly disposed with respect to the longitudinal axis 13 of the separation tower 10. Preferably, some of the baffle plates 40 slope downwardly toward the lower end 74 of the separation tower 10, whereby at least some of the baffle plates 40 define a generally serpentine first fluid passageway 50, as shown by arrows 51, through which the contaminated water 15 flows. Also, the baffle plates could be disposed substantially perpendicular to the longitudinal axis 13 of separation tower 10. However, preferably all of the baffle plates 40 are angularly disposed as illustrated. One of the many ways of creating the serpentine or tortuous path 50 is where the deflection members or baffle plates 40 are disposed in at least two generally parallel rows, with the baffle plates of adjacent rows of baffle plates being disposed in a staggered relationship with each other.

Figures 1, 1A, 1B:
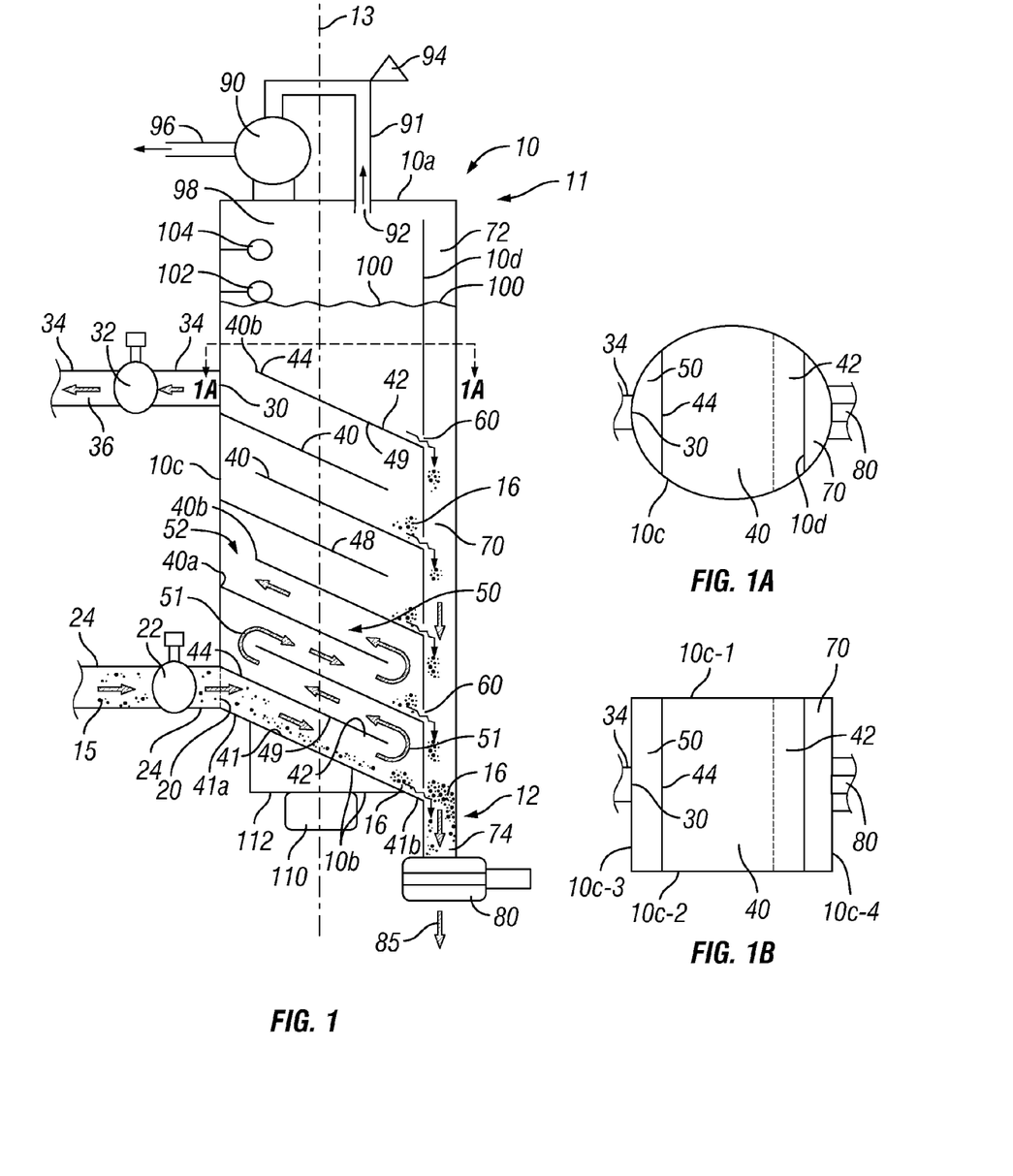
FIG. 1 is a partial cross-sectional view of one embodiment in accordance with the present invention of an apparatus for treatment of contaminated water.
FIG. 1A is a partial cross-sectional view taken along line 1A-1A of FIG. 1 depicting a separation tower embodiment having a cylindrical shape.
FIG. 1B is a partial cross-sectional view taken along line 1A-1A of FIG. 1 depicting a separation tower embodiment having a rectangular shape.
Figures 2, 2A:
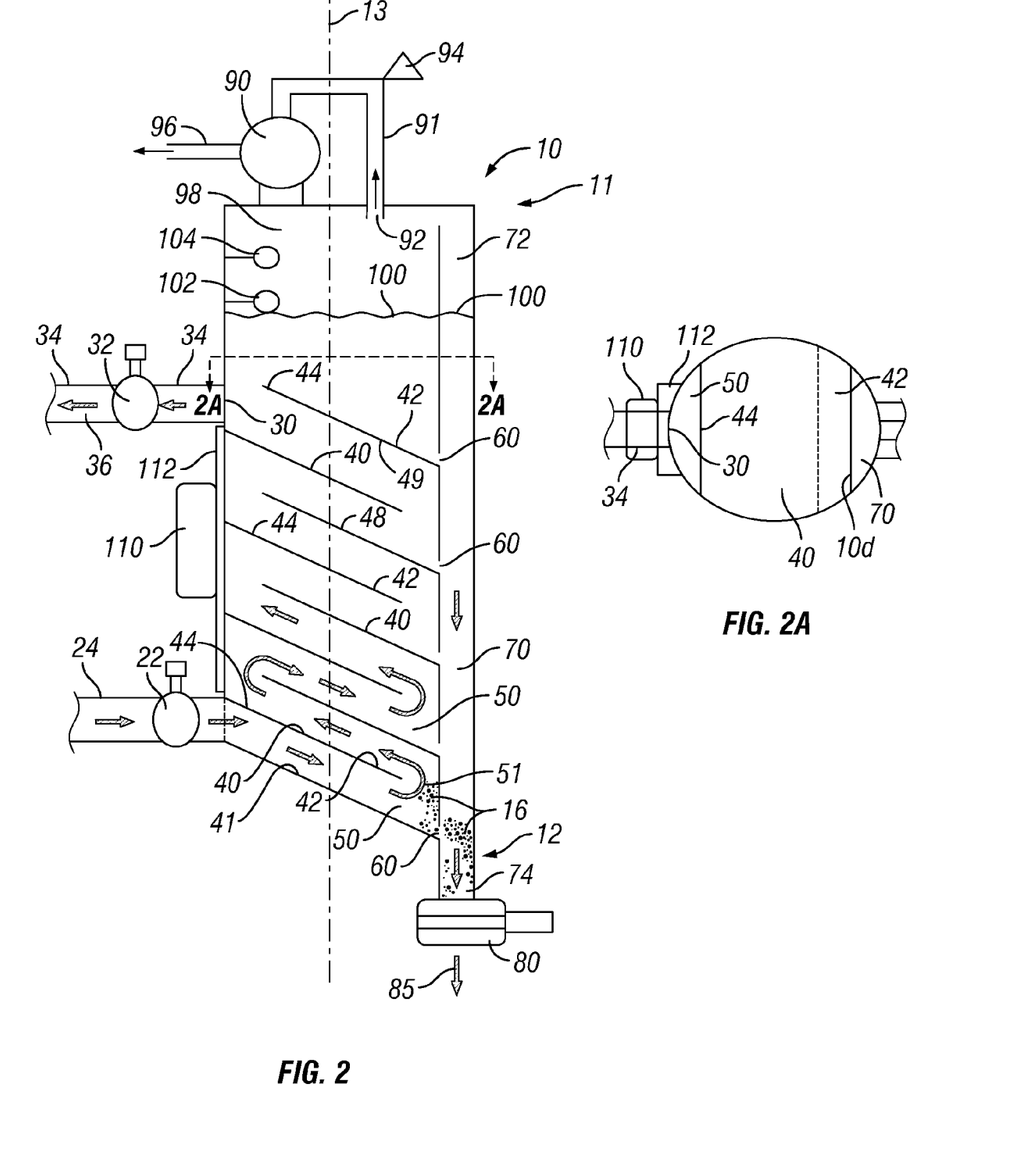
FIG. 2 is a partial cross-sectional view of one embodiment in accordance with the present invention of an apparatus for treatment of contaminated water.
FIG. 2A is a partial cross-sectional view taken along line 2A-2A of FIG. 2.
Figure 3:
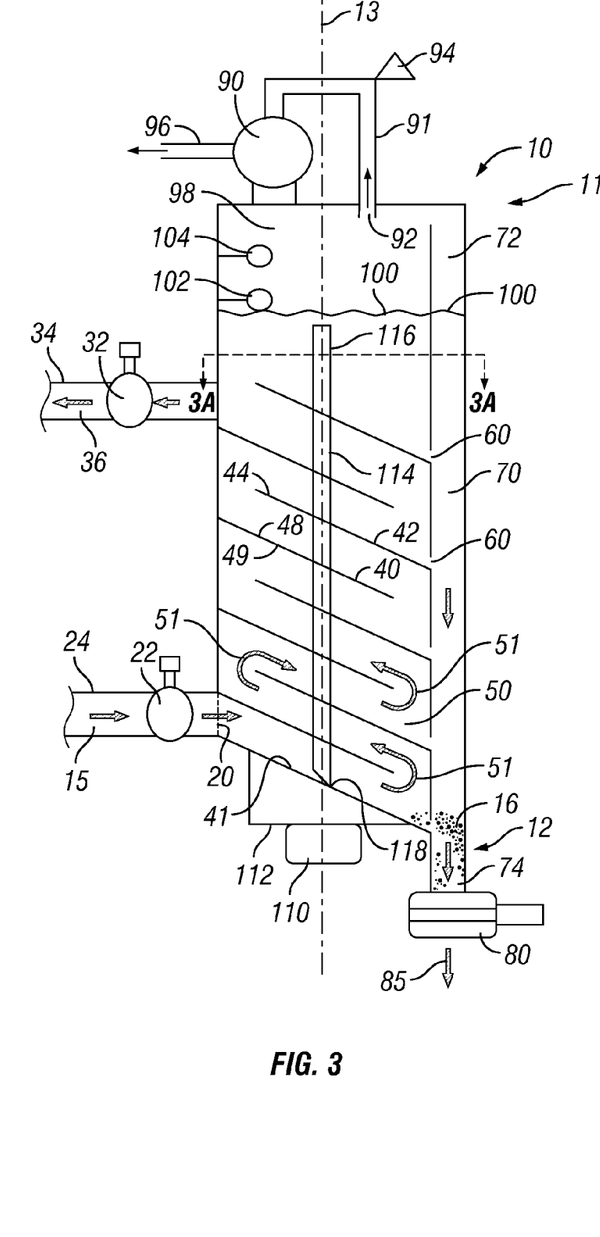
FIG. 3 is a partial cross-sectional view of one embodiment in accordance with the present invention of an apparatus for treatment of contaminated water.
Figure 3A:
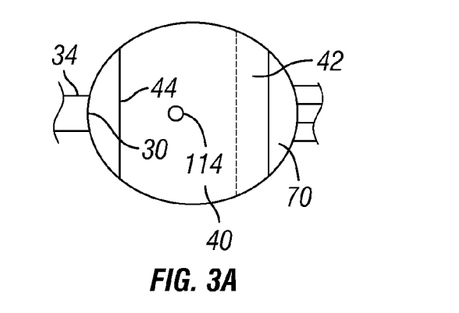
FIG. 3A is a partial cross-sectional view taken along line 3A-3A of FIG. 3.

With reference to FIGS. 1-3, the interior of the tower 10 can be vertically partitioned with partition bulwark 10d. One of the two parallel rows of baffle plates can be mounted to this partition bulwark, while the other of the two parallel rows of baffle plates can be mounted on the tower wall 10c opposite the partition bulwark 10d. The partition bulwark extends across the bottom 10a of the tower 10 interior upward toward the top of the tower 10b, above the topmost of the plurality of baffle plates 40, but preferably not all the way to the top of the tower 10b. At the lower end 42 of each baffle plate mounted to the partition bulwark 10d, there is found a solids discharge port 60. It will be understood that each baffle plate 40 is secured in sealed relationship on its two side edges to the inside surface of the tower wall 10c. Although FIGS. 1, 1A, and 2-5 depict an embodiment of the separation tower that is cylindrical in shape, other tower shapes are possible, such as, for example, a generally rectangular shape as illustrated with FIG. 1B (with outer walls 10c-1, 10c-2, 10c-3 and 10c-4).

As the contaminated water is drawn into the separator 10 through inlet 20, it flows along the bottom or first plate 41 from the bottom plate upper end 41a to the bottom plate lower end 41b. At the lower end 41b of the bottom plate 41, there is located the partition bulwark 10d. Located above the contaminated water inlet 20 is a baffle plate 40 attached to the separator wall 10c at the baffle plate attachment edge 40a and extending parallel to the first plate 41. This baffle plate's length extends across the separator but does not extend completely across the separator thereby leaving a gap 52 between its baffle plate outer edge 40b and the wall opposition its point of attachment 40a (i.e., where the plate 40 attaches to the separation tower wall 10c, the gap will be formed between the plate outer edge 40b and the partition bulwark 10d; where the plate attaches to the separation bulwark 10d, the gap will be formed between the plate outer edge and the separation tower wall 10c). The contaminated water 15 moving along the first plate 41 is deflected upward along the bulwark 10d until it hits the underside of the next of the alternating plates 40, this next plate being mounted to the bulwark. The contaminated water continues movement upwardly until it deflects off the tower wall 10c and up against the next plate, and so forth. As such, as the contaminated water continues to move upwardly within separation tower 10 by the operation of vacuum pump 90, undesired solid materials 16 within contaminated water 15 strike the underside 49 of the baffle plates 40 and are thus directed downwardly toward the lower end 74 of separation tower 10 via being discharged through the solids discharge ports 60 and into the standoff conduit 70, which, in the embodiments of FIGS. 1-3 and 5 is formed by the space between the backside of bulwark 10d (i.e., the side of bulwark opposite the side having the plates 40 attached thereto). As discussed below, in another embodiment (see FIG. 4), the separation tower does not contain the internal bulwark 10d and the standoff conduit 70A is formed as a separate conduit external to the separation tower 10. Preferably, baffle plates 40 are angularly disposed within a range of from 1° to 45° with respect to the longitudinal axis 13 of tower 10. Preferably, the plurality of baffle plates is located above the contaminated water inlet 20. The first plate 41 may serve as the base of the separation tower 10, and would be preferably located even with or below the contaminated water inlet 20.

As the contaminated water 15 is drawn or urged upwardly within separation tower 10 by, e.g., the operation of vacuum pump 90 or other motive means, undesired solid materials 16 within contaminated water 15 strike the underside of the baffle plates 49 and are thus directed downwardly toward the lower end 74 of separation tower 10. As the waste mixture flows downwardly along the downward slope from the plate upper end 44 to the plate lower end 42, solids 16 will fall out and preferentially be directed into the solids discharge port 60 located in the downward slope corner area 40c rather than making an upward turn required to continue along the tortuous or serpentine path 50. The liquid, on the other hand, will preferentially continue along the path of least resistance up through the serpentine path 50 towards the outlet 30. Each solids discharge port 60 is in fluid communication with standoff conduit 70, 70A and is preferentially of a smaller opening size than that of, e.g., the outlet 30 so that the path of least resistance for the liquid will be toward the outlet 30, and not through the solids discharge port 60. It will be understood to those of ordinary skill in the art that the size and shape of the solids discharge port 60 can be varied, for example, a rectangular slit design or a circular opening design are potentially used port configurations. Standoff conduit 70, 70A has an upper end 72 in fluid communication with the tower interior space 98 and a lower end 74. As the solids 16 drop through solids discharge port 60, they will fall toward the standoff conduit lower end 74 where they can be discharged from the separator 10 via, e.g., a solids discharge valve 80. As will be mentioned below, in a preferred embodiment, a vacuum may be applied to the interior air space 98 of the separator 10 to assist in the solids-liquid separation, and to assist in drawing the contaminated liquid 15 into and up through the separator 10, as well as drawing off undesired gasses. If such vacuum system is employed, then such solids discharge valve is preferably a rota-lock valve or other valve designed to collect solids from the standoff lower end 74 without disrupting the vacuum pressure in the system. The solids 16 collected in the lower end 74 of the standoff conduit 70 can be removed either continuously or periodically by operation of the solids discharge valve 80. The solids 16 that are released through solids discharge valve 80 can then be conveyed to another desired location by suitable conveyance devices, such as, for example, belt conveyor, auger, cuttings box, sludge pump, etc.

Figures 4, 4A:
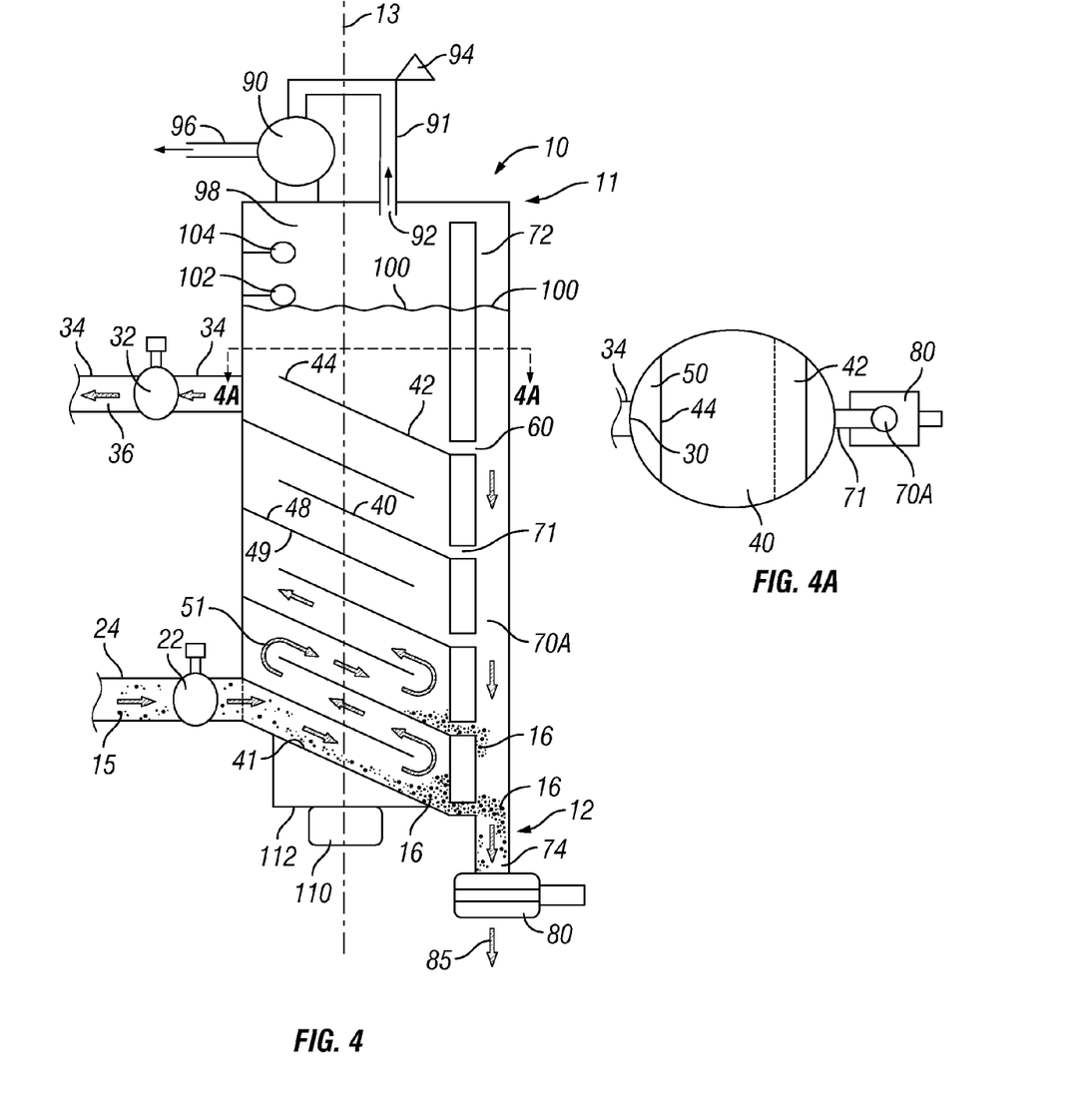
FIG. 4 is a partial cross-sectional view of one embodiment in accordance with the present invention of an apparatus for treatment of contaminated water.
FIG. 4A is a partial cross-sectional view taken along line 4A-4A of FIG. 4.

Referring to FIGS. 4 and 4A there is depicted an external standoff conduit 70A that is created as a standalone pipe section. Each solids discharge port 60 is linked in fluid communication with external standoff conduit 70A via discharge port conduits 71. Although the discharge port conduits 71 are depicted shown as horizontal conduits, they could be angularly mounted to continue the downward slope of the plate 40. As will be understood to those of ordinary skill in the art, many different standoff conduit configurations could be employed.

Preferably, the serpentine-like channel or path 50 begins proximate the contaminated liquid inlet 20, and ends proximate the treated water outlet 30.

During operation of the separator, the fluid level will rise to the water line (or liquid level) 100. The liquid level can be regulated and monitored with a float valve/switch or other suitable device 102. In a preferred embodiment, the operation of the inlet valve 22, outlet valve 32, liquid level indicator 102, and solids discharge valve 80 are coordinated and in communication to permit smooth operation of the separator 10.

In a preferred embodiment, a vacuum clarification system is employed. Through the use, or application of an applied vacuum, liquids having a difference of greater than 0.05 specific gravity may be effectively separated. In addition, particulate solids by virtue of greater weight (or density), than the liquids in which they are suspended, may also be separated from one or more liquid phases. The basis upon which vacuum clarification operates is that of barometric differentiation. Specifically, at sea level (0.0 ft. altitude), the atmosphere exerts a force equal to 14.7 lbs/sq. in. This value may also be read as 760.0 mm Hg (29.92 inches Hg) in a barometer. This pressure of 1 atmosphere (14.7 lbs/sq. in.) also equates to an equivalent head of water of 34.0 ft. @ 75 degrees F.

In this preferred embodiment, a vacuum pump 90 is employed to pull a vacuum on the interior air space 98 of the separator/vessel 10 via vacuum inlet conduit 92. The vacuum pump employs a discharge port 96 for directing discharged air/gas to a desired location of the operator (e.g., the vacuum discharge may contain gases that can be recycled for use or must be directed to an appropriate disposal area). The vacuum pressure is regulated by vacuum regulator 94. The vacuum apparatus 90 applies a vacuum in and at the top of the separation tower 10 (in air space or vacuum chamber space 98) for drawing the contaminated water from the holding tank or other source (not shown) through the water inlet 20 and upwardly into, and through, the separation tower and for removing undesired gaseous materials from the contaminated water. Preferably, the vacuum force is approximately 29"-29.5" of mercury. Where a vacuum is employed, in a preferred embodiment, the operation of the inlet valve 22, outlet valve 32, liquid level indicator 102, solids discharge valve 80 and vacuum (via regulator 94) are coordinated and in communication to permit smooth operation of the separator 10 and to permit the desired fluid level 100 in the separator 10. As a back-up or safety kill switch, a second water level indicator switch device 104 is located above the first water level indicator 102 and can be programmed to shut down the system in the event that the water level 100 reaches the level of the second indicator 104. Such safety system serves, e.g., to protect the vacuum system from receiving liquid into its pump, as doing so could damage the vacuum equipment. The actual vacuum pump 90 need not be located physically on the separator as shown, but instead can be located at some other location so long as the vacuum pump 90 remains in vacuum fluid communication with separator 10 via vacuum conduit 91.

As seen in FIGS. 1-5, separation tower 10 generally has a circular cross-sectional configuration; however, it will be readily apparent to one of ordinary skill in the art, that separation tower 10 could have any desired cross-sectional configuration, such as square, oval, rectangular, etc., although a circular cross-sectional configuration is preferred. Likewise, the various fluid passageways, or conduits, described herein, disposed in fluid communication with, and between separation tower 10 also preferably have a circular cross-sectional configuration, but it will be readily apparent to one of ordinary skill in the art that such fluid passageways, or conduits, could have any desired cross-sectional configuration, such as oval, square, triangular, etc. Unless hereinafter indicated, all of the components of water treatment apparatus 10 may be made of any suitable material having the requisite strength characteristics to function as separation tower 10, as well as in the case of separation tower 10, to withstand the vacuum pressure forces that may be exerted upon separation tower 10. Accordingly, the various components of apparatus 10, unless a specific material is hereinafter set forth, may be made of commercially available metallic materials, such as various types of steel, or various plastic materials, which are well known and commercially available. Since the contaminated water is only being treated to remove sufficient amounts of undesired solids, liquid, and/or gaseous materials to render the contaminated water in compliance with various governmental discharge standards, it is not necessary that any of the components of apparatus 10 be constructed of stainless steel, unless the extra durability and corrosion resistant characteristics of stainless steel are desired.

To enhance the solids-liquids separation (and separation of entrained gasses) occurring in solid liquid separators such as separator 10, one or more sources of vibration 110 can be applied to the walls of the separator 10 and/or to one or more of the baffle plates 40 in any desired location. It is preferred to provide each baffle/deflector plate with a source of vibration. Referring to FIGS. 1 and 4, in one preferred embodiment, a vibrator motor or other source of vibration 110 is mounted onto the underside of separator 10 using a suitable mount 112.

Referring to FIGS. 2 and 2A, in another preferred embodiment, a vibrator motor or other source of vibration 110 is mounted onto the side of separator 10 using a suitable mount 112. In this preferred embodiment, if the separator is cylindrical in shape (as shown here), then preferably the vibrator mount 112 is designed to evenly disperse the vibration across the outer circumferential area of the separator 10 in the region of the baffle plates 40.

Referring to FIG. 3, in another preferred embodiment, a vibrator motor or other source of vibration 110 is mounted onto the underside of separator 10 using a suitable mount 112 (much like as in FIG. 1). In this embodiment, a vibrator connecting rod 114 is mounted within the separator, preferably along the centerline/longitudinal axis 13. The rod 114 has a top end 116 and a bottom end 118. In this embodiment, the bottom end 118 of rod 114 is fixably mounted to the first baffle plate proximate the vibrator motor 110. The rod 114 passes generally upward through each adjacent baffle plate, and terminates above the last baffle plate 40. The rod 114 serves to transmit vibration from the vibration source 110 into each baffle/deflection plate 40. Preferably, the rod 114 is fixably mounted to each baffle plate, such as by welding or other suitable means.

Figure 5:
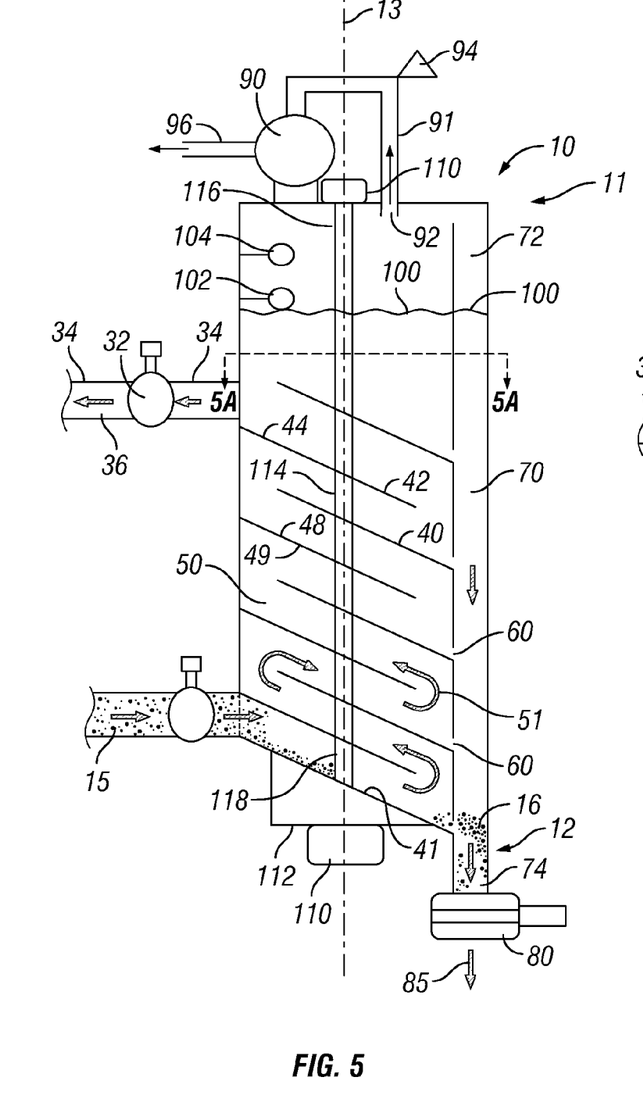
FIG. 5 is a partial cross-sectional view of one embodiment in accordance with the present invention of an apparatus for treatment of contaminated water.
Figure 5A:
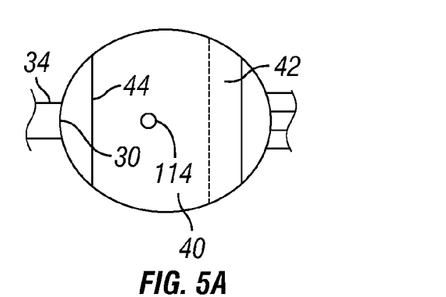
FIG. 5A is a partial cross-sectional view taken along line 5A-5A of FIG. 5.

Referring now to FIGS. 5 and 5A, in an alternate preferred embodiment, the rod 114 depicted in FIG. 3 can extend from the lower end 12 of separator/vessel 10 to the upper end 11 of separator/vessel 10. In this embodiment, the vibration source 110 could be mounted on either the underside or top side of separator 10 proximate to the rod lower end 118 or rod top end 116.

As will be understood, one or more vibration sources 110 can positioned at any desired location on or within the separator 10. The use of the vibration source improves solid liquid separation and helps maintain a clean surface on the baffle plates 40. The vibration can be created by any available source, such as, mechanical, electrical, air-driven, or hydraulic-driven vibrator devices and/or by sonic waves, microwaves, or other source of vibration. The vibration is designed to disturb the molecular bonding of the liquids and the vibration amplification can be controlled by means of a V.F.D. (variable frequency drive) or other apparatus to change the rotational speed of the motor (and hence the vibration intensity). If a air or hydraulic vibrator device is used, the amplification can be controlled through pressure regulation or valve arrangements. If electric or electronic vibration such as sonic or microwaves are used, the amplification can be adjusted by electronic means. As the flow of solids laden liquid 15 enters the inlet header 20, it is directed downward across the first vibrating plate 40, 41). The vibration applied to the bottom plate disturbs the molecular bond of the liquids and causes settling of solid particulate matter. The downward flow path along with the vibration pushes the particulates to the lower edge 42 of the slant plate 40 where it is then directed into the standoff conduit 70. The flow characteristics in the standoff conduit are such that the lack of flow does not keep the solid particulates entrained, but rather permits them to fall out to the bottom of the standoff conduit where they can be discharged for further handling, disposal or use as may be desired. The flow of the solid-liquid mixture to be treated is directed upwardly through the tortuous path 50 caused by the baffle 40 arrangement. As the solids laden liquid moves upwards through this tortuous path, separation of the solids is enhanced by the vibrational energy emitted from each plate 40, and the solids 16 are separated and fall into the standoff conduit 70 thereby repeating the process until all undesirable particulate is removed. Entrained gasses will also be released by the vibration and removed via the vacuum source.

In another preferred embodiment of the present invention, there is described an improved method of clarifying water using vibrational energy to enhance solid-liquid separation from a source of solids-laden water to be treated and/or to enhance removal of undesired gasses entrained in the waste. In this method, solids laden liquid, such as waste water, drilling mud, etc., are introduced into a flow path conduit. In a preferred embodiment, the flow path is serpentine-like. In one preferred embodiment, the flow path of the liquid to be treated within this conduit is oriented in a generally upward or vertical direction—in other words, the clarified water exits the separator at a point vertically above the separator inlet. In one embodiment, a vacuum source is applied to assist in drawing the solids-laden liquids into and through the separator and to assist in the vacuum clarification of the solid-liquid mixture to be treated. As the solid-liquid mixture moves through the system (either via vacuum or other motive force), a source of vibration is applied to the flow path. The solids falling out of solution are collected at a lower end of the separator for disposal or other desired handling, and the clarified liquid is collected outside of the outlet for further handling or disposal.

In another preferred method of the present invention, a liquid to be treated is introduced into the inlet of a separator of the types as described herein in connection with FIGS. 1-5. A vacuum is applied to the system. The liquid to be treated is then directed through a conduit configured into a tortuous flow path. Vibrational energy is applied to the flow path. As solids fall out of solution, they are collected. The clarified liquid is also collected. The solids separation system of the present invention can employ more than one separator, working either in parallel or in series, either alone or in conjunction with other treatment equipment.

As mentioned above, as the solids 16 drop through solids discharge port 60, they will fall toward the standoff conduit lower end 74 where they can be discharged from the separator 10 via, e.g., a solids discharge valve 80. Additionally, in another embodiment of the present invention, the solids discharge valve 80 is removed and the standoff lower end 74 is connected to a pump (not shown). The pump serves to pull solids out of the separator conduit lower end 74 and provide a flow force for the solids to follow. The discharge from the pump is preferably directed to a vortex removal device (not shown), such as a de-sander cone or de-silter cone (or the like) available and known to those of ordinary skill in the art. The solids collected in the de-sander or de-silter can then be directed to a desired place of disposal via standard disposal techniques.

Figure 6:
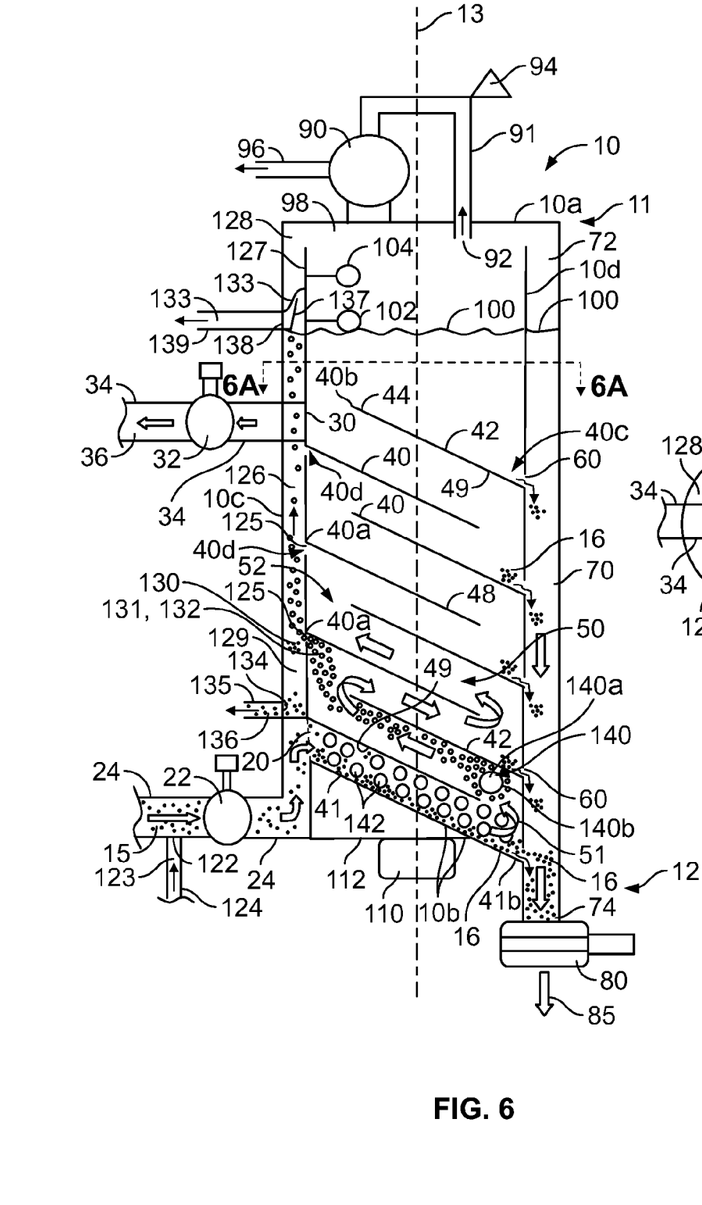
FIG. 6 is a partial cross-sectional view of one embodiment in accordance with the present invention of an apparatus for treatment of contaminated water.

Referring now to FIG. 6, there is shown another embodiment illustrating additional features that may be employed to benefit. For example, the separator devices 10 described herein and in connection with FIGS. 1-6 may also be outfitted with a chemical injection inlet 122 for use in injecting desired chemicals or treatment solution streams 123 into the contaminated feed liquid 15. The chemicals or treatment solutions 123 are prepared and fed from a chemical storage receptacle (not shown) through chemical injection conduit 124 to a desired entry location in the separator (hear, shown for example proximate the inlet valve 22, but other locations could be suitable. The chemicals or treatment solutions 123 could comprise coagulants, flocculants, and other desired chemical treatment regimes based upon the characteristics of the solid/liquid feed mixture 15.

Figure 6A:
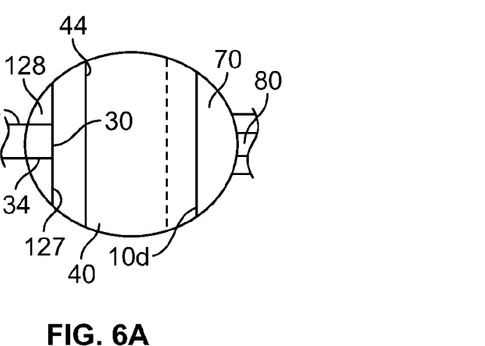
FIG. 6A is a partial cross-sectional view taken along line 6A-6A of FIG. 6 depicting a separation tower embodiment having a cylindrical shape.

Also, referring still to FIGS. 6 and 6A, the separator devices 10 described herein and in connection with FIGS. 1-6 may also be outfitted with one or more slots or upper discharge ports 125 that fluidly connects to a secondary standoff conduit 126. Similar to FIGS. 1-3, the interior of the tower 10 can be vertically partitioned with the secondary partition bulwark 127. One of the two parallel rows of baffle plates 40 can be mounted to partition bulwark 10d, while the other of the two parallel rows of baffle plates 40 can be mounted on the secondary partition bulwark 127 opposite the partition bulwark 10d. The secondary partition bulwark extends across the bottom 10a of the tower 10 interior upward toward the top of the tower 10b, above the topmost of the plurality of baffle plates 40, but preferably not all the way to the top of the tower 10b. On the underside of the baffle plate attachment edge 40a of each baffle plate mounted to the secondary partition bulwark 127 (other than the first plate 41), there is found one or more slots or upper discharge ports 125 located in the upward slope upper corner area 40d. It will be understood that each baffle plate 40 is secured in sealed relationship on its two side edges to the inside surface of the tower wall 10c. Although FIGS. 1, 1A, and 2-6 depict an embodiment of the separation tower that is cylindrical in shape, other tower shapes are possible, such as, for example, a generally rectangular shape as illustrated with FIG. 1B (with outer walls 10c-1, 10c-2, 10c-3 and 10c-4). As such, the standoff conduit 70 serves as a primary static zone while the secondary standoff conduit 126 serves as a secondary static zone.

As the waste mixture flows downwardly along the downward slope from the plate upper end 44 to the plate lower end 42, solids 16 will fall out and preferentially be directed into the solids discharge port 60 rather than making an upward turn required to continue along the tortuous or serpentine path 50. The liquid, on the other hand, will preferentially continue along the path of least resistance up through the serpentine path 50 towards the outlet 30. Any lighter components of the waste mixture, such as gasses and oils or light colloidal or light particulate or suspended solids material, will tend to migrate up to and through the slots 125 and into the secondary standoff conduit 126. Each slot 125 is in fluid communication with the secondary standoff conduit 126 and is preferentially of a smaller opening size than that of, e.g., the outlet 30 so that the path of least resistance for the liquid will be toward the outlet 30, and not through the solids discharge port 60. In one embodiment, the slots 125 have a slit or opening width of about ¼ inch, and extend across the full width of the secondary standoff bulwark 127. It will be understood to those of ordinary skill in the art that the size and shape of the slots or upper discharge ports 125 can be varied, for example, a rectangular slit design or a circular opening design are potentially useful port configurations. Secondary standoff conduit 126 has an upper end 128 and a lower end 129. As the light gasses and oils 131 (or microbubbles 132 discussed below) pass through the slots 125, they migrate upward in the secondary standoff conduit 126. When the gasses break through the surface of the oil phase 133, they are permitted to enter the evacuated airspace 98 (the upper conduit end 128 being in fluid communication with the airspace 98) and be drawn out through the vacuum conduit 91. As the oil phase 133 reaches the top section 128 of the secondary standoff conduit 126, the oil phase 133 can spill over a weir 137 which is in fluid connection with secondary standoff conduit upper outlet 138 where the oil phase 133 (or other phase present here) can be discharged through secondary standoff conduit upper discharge tubing 139 for any desired further handling, disposal or reuse.

As the colloidal or suspended solids 130 drop through upper discharge port 125, they will fall toward the secondary standoff conduit lower end 129 where they can be discharged from the separator 10 via, e.g., a secondary standoff conduit lower outlet 134 into appropriate transfer piping/conduit 135 so that the discharged contents 136 can be directed for any desired further handling, disposal or reuse. Additionally, colloidal or suspended solids materials may become entrained in the gasses 131 or microbubbles 132 and be carried up to the oil phase surface where the gas or microbubbles will then release such material, and such material can then coagulate and fall downward to discharge outlet 134.

Additionally, still referring to FIGS. 6 and 6A, the separator devices 10 described herein and in connection with FIGS. 1-6 may also be outfitted with one or more sparging devices 140 comprising an internal conduit space 140a connected in fluid communication with a source of sparging gas (not shown), and one or more perforations to permit the sparge gas to discharge from the internal conduit space 140a into the surrounding solids/liquid mixture encountered in the separation path 50. In this embodiment, the sparging gas would not be introduced in the first section of the path 50 along lower plate 41 because the gas would migrate upward and become trapped near the contaminated liquids inlet 20. Instead, the sparging device(s) are preferentially located above the solids discharge ports 60 so that the sparge bubbles can migrate upward until they reach the upper discharge slots 125. Although only one sparge unit 140 is depicted in FIG. 6 (in the upper portion of the first upward turn of serpentine path 50), it will be understood by those having the benefit of the disclosure herein that more than one sparge unit can be employed, such as in the vicinity below each upwardly directed plate 40. In one embodiment, the sparge device comprises a porous tubular member or pipe extending across the width of the path 50. In another embodiment, a plurality of individual sparge devices are mounted proximate each other. In one embodiment, the sparge gas exits the sparge device as microbubbles. The microbubbles or microfine bubbles can assist in washing the solids. In one embodiment, the sparge gas is carbon dioxide. In another embodiment, the sparge gas is selected based on its ability to assist in removing or scrubbing oil from the solids phase of the solid liquid feed mixture 15. In one embodiment, carbon dioxide is used as the sparge gas to help wash the oil off of the solids phase. In another embodiment, sparging devices are located at every upward turn in the serpentine path 50. The sparge gas or air can vary in chemical makeup and temperature. Sparge gas temperature may be adjusted to influence the viscosity and settling rate of the fluids being treated. The actual bubble size achieved within the flow path 50 may depend on a number of factors, including, the changing conditions of the solution 15 being treated, the temperature, viscosity, solids loading, etc.

The introduction of micro-bubbles will temporally reduce the viscosity of the fluid 15 thereby allowing more particles 16 to migrate downwardly to the primary static zone for removal and disposal. The very small particles not removed will attach themselves to a gas bubble and become buoyant thereby allowing the removal upwardly to the secondary static zone (similar to Dissolved Air floatation (DAF) technology) rather than continuing along the path 50 to the exit 30. A preferred sparge gas for oil separation is carbon dioxide gas as it has a natural affinity for oil and greatly aids in the separation and reclaiming of oils. The oils will collect in the secondary static zone where it will build up and flow over the overflow weir 138 into a tank (not shown) for removal and reuse or disposal. The colloids or other small suspended solids will move into the secondary static zone where they will lose the attached gas bubble to the vacuum and settle over time to the bottom of the secondary zone to be removed through port 134 located at the lower extremity of the secondary static zone. The separator device of the present disclosure can permit 3-phase separation of liquids that are contaminated by solids and oils.

In yet another embodiment of the present disclosure, an array of spaced-apart, electrodes 142 can be introduced into the flow path 50 to serve as a source for introducing an electrical current into the fluids 15 to permit electrocoagulation to take place. In one embodiment, the electrodes are rods that extend across the flow path 50 from side to side in a matrix that itself creates a tortuous path that creates impingement of the solids causing the solids to strike the electrodes and slow down. The electrodes are electrically insulated at the point of attachment to the walls of the separator (e.g., with suitable insulating grommet or the like that can also serve to create a seal around such point of attachment), and are also spaced apart so that the electrodes do not touch each other. In another embodiment, the electrodes protrude into the flow path 50 in a staggered length fashion. Sufficient spacing exists between the electrodes 142 and the plates 40, 41 so as to permit solids to pass therebetween. A current is induced into the electrodes, and the polarity of the electrodes is alternated between positive (+) and negative (−) polarity. Process control equipment (not shown) automatically controls the polarity of the electrodes (and the amperage/voltage). An appropriate current is induced (for example, a low amperage current such as about 15 amps of current but other suitable currents can be employed.) into the electrodes.

The array of rods 142 to be used as positive and negative electrodes will be inserted between the first and second plates 41, 49 to allow maximum contact of the fluid 15 being directed through the system. The electrodes 142 can comprise any material that will conduct current flow, such as iron, aluminum, stainless steel, carbon fiber, etc. A preferred material for the electrodes 142 is carbon rods. Carbon rods have proven to be more resistant to decay from the electrical activity and more resistant to scale buildup. The addition of electro-coagulation will carry many benefits including but not limited to removal of certain dissolved solids such as heavy metals and destruction of undesired bacterial contamination.

REFERENCES

The following represents an exemplary list of references.

U.S. Patent References

1. U.S. Pat. No. 5,741,426 McCabe et al.

All references referred to herein are incorporated herein by reference. While the apparatus and methods of this invention have been described in terms of preferred embodiments, it will be apparent to those of skill in the art that variations may be applied to the process and system described herein without departing from the concept and scope of the invention. All such similar substitutes and modifications apparent to those skilled in the art are deemed to be within the scope and concept of the invention. Those skilled in the art will recognize that the method and apparatus of the present invention has many applications, and that the present invention is not limited to the representative examples disclosed herein. Moreover, the scope of the present invention covers conventionally known variations and modifications to the system components described herein, as would be known by those skilled in the art. While the apparatus and methods of this invention have been described in terms of preferred or illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

I claim:

1. A vacuum assisted solid-liquid separation apparatus for treating contaminated liquids contaminated with undesired solids and gasses, comprising:
   (a) an enclosed separation tower having an upper end and a lower end opposite thereto, a longitudinal axis oriented substantially vertically through the upper end and the lower end, an outer wall, a top wall connected to the outer wall at the upper end and a bottom wall connected to the outer wall opposite the top wall, the outer wall having an inside surface and an outside surface;
   (b) a tower interior space defined as the space within the outer wall, top wall and bottom wall;
   (c) a contaminated liquids inlet located proximate the vessel lower end for introducing the contaminated liquids into the tower interior space;
   (d) a clarified liquids outlet located above the contaminated liquids inlet for discharging the clarified liquids to a desired location;
   (e) a plurality of baffle plates disposed in the tower interior space in a spaced apart relationship, with at least some of the baffle plates being angularly disposed with respect to the longitudinal axis of the separation tower to define a generally serpentine fluid flow passageway,
      the serpentine fluid passageway having a first end in fluid communication with the contaminated liquid inlet, and a second end in fluid communication with the clarified water outlet and the tower interior space proximate the upper end of the tower,
      the angular disposition of the plates creating a series of alternating downwardly and upwardly sloped flow segments within the serpentine first fluid path wherein the contaminated liquid generally flows downwardly in each of the downwardly sloped segments into a downward slope corner and upwardly in the upwardly sloped segment;
   (f) one or more solids discharge ports located in one or more of the downward slope corners;
   (g) a standoff conduit in fluid communication with the one or more solids discharge ports for receiving solids from the contaminated water through the one or more solids discharge ports, the standoff conduit having at its lower end a solids outlet port;
   (h) a vacuum inlet in fluid communication with the tower interior space and located above the clarified liquid outlet for pulling a vacuum on the tower interior space to urge contaminated liquid into the contaminated liquid inlet and up through the serpentine fluid flow passageway to the clarified liquid outlet;

(i) one or more sources of vibrational energy applied to the separation apparatus; and (j) one or more electrocoagulation electrodes housed within said serpentine fluid passageway capable of discharging an electrical current into the fluid, wherein said electrodes are capable of alternating between a positive polarity and a negative polarity and are controlled by process control equipment.

2. The solid-liquid separation apparatus of claim 1 wherein vibration energy sources are created by mechanical, electrical, air-driven, or hydraulic-driven vibrator devices and/or by sonic waves, microwaves, or sources of vibration that provide for control of the amplification of the vibration by means of a variable frequency drive or other apparatus to change the intensity of the vibration.

3. The solid-liquid separation apparatus of claim 1 wherein a single source of vibrational energy is applied to the separation apparatus.

4. The solid-liquid separation apparatus of claim 1 wherein more than one source of vibrational energy is applied to the separation apparatus.

5. The solid-liquid separation apparatus of claim 1 wherein the source of vibrational energy is directed to the plurality of baffle plates.

6. The solid-liquid separation apparatus of claim 1 wherein the source of vibrational energy is located on the bottom, top and/or side of the tower.

7. The solid-liquid separation apparatus of claim 1 further comprising a connecting rod extending from the lower end of the tower and upward through the plurality of baffle plates, the connecting rod having a first end located proximate one of the one or more vibrational energy sources and a second end terminating either within the tower interior space or extending into the tower upper end.

8. The solid-liquid separation apparatus of claim 1 wherein the connecting rod second end extends into the tower upper end and both ends of the connecting rod receive a source of vibrational energy from the vibrational energy sources.

9. The solid-liquid separation apparatus of claim 1 wherein the tower is substantially cylindrical, rectangular or square in shape.

10. The solid-liquid separation apparatus of claim 1 wherein the tower is substantially cylindrical in shape.

11. The solid-liquid separation apparatus of claim 1 wherein the standoff conduit is located within the tower.

12. The solid-liquid separation apparatus of claim 1 wherein the standoff conduit is located external to the tower.

13. The solid-liquid separation apparatus of claim 1 further comprising an inlet control valve for controlling the flow of contaminated liquid through the contaminated liquids inlet, a clarified liquid outlet control valve for controlling the flow of clarified liquid through the clarified liquids outlet, a solids discharge control valve for controlling the flow of solids out of the standoff conduit and a liquid level control device for monitoring and controlling the liquid level in the tower.

14. The solid-liquid separation apparatus of claim 13 further comprising a process controller to monitor and coordinate the operation of the inlet control valve, the clarified liquid outlet control valve, the solids discharge control valve and/or the liquid level control device.

15. The solid-liquid separation apparatus of claim 1 further comprising a pump connected with the solids outlet port to facilitate removal of received solids from the standoff conduit.

16. The solid-liquid separation apparatus of claim 1 wherein the at least some of the angularly disposed baffle plates are angularly disposed with respect to the longitudinal axis of the separation tower between 45 and 60 degrees.

17. The vacuum assisted solid-liquid separation apparatus of claim 1 further comprising a chemical injection port for introducing into said serpentine fluid path one or more desired treatment chemicals.

18. A method of removing undesirable solids and gasses from liquid contaminants comprising the steps of:

(a) directing the contaminated liquids into the inlet of a vacuum assisted solid-liquid separation apparatus for treating contaminated liquids contaminated with undesired solids and gasses, the apparatus comprising i. an enclosed separation tower having an upper end and a lower end opposite thereto, a longitudinal axis oriented substantially vertically through the upper end and the lower end, an outer wall, a top wall connected to the outer wall at the upper end and a bottom wall connected to the outer wall opposite the top wall, the outer wall having an inside surface and an outside surface;

ii. a tower interior space defined as the space within the outer wall, top wall and bottom wall;

iii. a contaminated liquids inlet located proximate the vessel lower end for introducing the contaminated liquids into the tower interior space;

iv. a clarified liquids outlet located above the contaminated liquids inlet for discharging the clarified liquids to a desired location;

v. a plurality of baffle plates disposed in the tower interior space in a spaced apart relationship, with at least some of the baffle plates being angularly disposed with respect to the longitudinal axis of the separation tower to define a generally serpentine fluid flow passageway, the serpentine fluid passageway having a first end in fluid communication with the contaminated liquid inlet, and a second end in fluid communication with the clarified water outlet and the tower interior space proximate the upper end of the tower, the angular disposition of the plates creating a series of alternating downwardly and upwardly sloped flow segments within the serpentine first fluid path wherein the contaminated liquid generally flows downwardly in each of the downwardly sloped segments into a downward slope corner and upwardly in the upwardly sloped segment;

vi. one or more solids discharge ports located in one or more of the downward slope corners;

vii. a standoff conduit in fluid communication with the one or more solids discharge ports for receiving solids from the contaminated water through the one or more solids discharge ports, the standoff conduit having at its lower end a solids outlet port;

viii. a vacuum inlet in fluid communication with the tower interior space and located above the clarified liquid outlet for pulling a vacuum on the tower interior space with a vacuum apparatus to urge contaminated liquid into the contaminated liquid inlet and up through the serpentine fluid flow passageway to the clarified liquid outlet;

ix. one or more sources of vibrational energy applied to the separation apparatus; and x. one or more electrocoagulation electrodes housed within said serpentine fluid passageway capable of discharging an electrical current into the fluid, wherein said electrodes are capable of alternating between a positive polarity and a negative polarity and are controlled by process control equipment;

(b) applying at least one vibrational energy source to the separation apparatus;

(c) applying a vacuum source at the vacuum inlet via the vacuum apparatus;

(d) flowing the solids laden liquids from the inlet upwardly through the generally serpentine fluid flow passageway with the vacuum apparatus to cause undesired solid materials striking the baffle plates to be directed downwardly into the standoff conduit toward the lower end of the separation tower;

(e) introducing a current from said electrodes into said serpentine fluid passageway, and alternating the polarity of said electrodes between positive and negative polarity;

(f) removing clarified liquid from the separation tower through the clarified water outlet, (g) removing undesired gasses out through the vacuum apparatus; and (h) removing undesired solids from the standoff conduit.

19. The method of claim 18 wherein the solid-liquid separation apparatus further comprises an inlet control valve for controlling the flow of contaminated liquid through the contaminated liquids inlet, a clarified liquid outlet control valve for controlling the flow of clarified liquid through the clarified liquids outlet, a solids discharge control valve for controlling the flow of solids out of the standoff conduit and a liquid level control device for monitoring and controlling the liquid level in the tower, and a process controller to monitor and coordinate the operation of the inlet control valve, the clarified liquid outlet control valve, the solids discharge control valve and/or the liquid level control device, the method comprising the further steps of monitoring and coordinating the operation of the inlet control valve, the clarified liquid outlet control valve, the solids discharge control valve and/or the liquid level control device.

20. The method of claim 18 wherein the vibration energy sources are created by mechanical, electrical, air-driven, or hydraulic-driven vibrator devices and/or by sonic waves, microwaves, or sources of vibration that provide for control of the amplification of the vibration by means of a variable frequency drive or other apparatus to change the intensity of the vibration, and the method comprises the further step of controlling the amplification or intensity of the vibration.

21. The method of claim 18 further comprising the step of directing the vibrational energy to the serpentine flow pathway.

22. The method of claim 18 wherein the solid-liquid separation apparatus further comprises: (xi) one or more gas spargers mounted within said serpentine fluid passageway in an area above said one or more solids discharge ports located in said one or more of the downward slope corners for introducing a sparge gas into said serpentine fluid pathway, and said method further comprises the step of introducing said sparge gas into said serpentine fluid pathway.

23. The method of claim 18 wherein the solid-liquid separation apparatus further comprises: (xi) a chemical injection port for introducing into said serpentine fluid path one or more desired treatment chemicals, and said method further comprises the step of introducing said one or more chemicals into said serpentine fluid pathway.

24. A vacuum assisted solid-liquid separation apparatus for treating contaminated liquids contaminated with undesired solids and gasses, comprising:

(a) an enclosed separation tower having an upper end and a lower end opposite thereto, a longitudinal axis oriented substantially vertically through the upper end and the lower end, an outer wall, a top wall connected to the outer wall at the upper end and a bottom wall connected to the outer wall opposite the top wall, the outer wall having an inside surface and an outside surface;

(b) a tower interior space defined as the space within the outer wall, top wall and bottom wall;

(c) a contaminated liquids inlet located proximate the vessel lower end for introducing the contaminated liquids into the tower interior space;

(d) a clarified liquids outlet located above the contaminated liquids inlet for discharging the clarified liquids to a desired location;

(e) a plurality of baffle plates disposed in the tower interior space in a spaced apart relationship, with at least some of the baffle plates being angularly disposed with respect to the longitudinal axis of the separation tower to define a generally serpentine fluid flow passageway, the serpentine fluid passageway having a first end in fluid communication with the contaminated liquid inlet, and a second end in fluid communication with the clarified water outlet and the tower interior space proximate the upper end of the tower, the angular disposition of the plates creating a series of alternating downwardly and upwardly sloped flow segments within the serpentine first fluid path wherein the contaminated liquid generally flows downwardly in each of the downwardly sloped segments into a downward slope corner and upwardly in the upwardly sloped segment toward an upward slope upper corner;

(f) one or more solids discharge ports located in one or more of the downward slope corners;

(g) a standoff conduit, having upper and lower ends, in fluid communication with the one or more solids discharge ports for receiving solids from the contaminated water through the one or more solids discharge ports, the standoff conduit having at its lower end a solids outlet port, and having its upper end in fluid communication with the tower interior space;

(h) one or more upper discharge slots located in one or more of the upward slope upper corners;

(i) a secondary standoff conduit, having upper and lower ends, in fluid communication with the one or more upper discharge slots for receiving gasses, oils, bubbles and other lighter materials from the contaminated liquids through the one or more upper discharge slots, the secondary standoff conduit having at its lower end a lower outlet for discharging accumulated solids, and having housed within its upper end an upper outlet coupled with a weir for receiving oil and discharging oil out the outlet into discharge tubing, the upper end of the secondary standoff conduit being in fluid communication with the tower interior space;

(j) a vacuum inlet in fluid communication with the tower interior space and located above the clarified liquid outlet for pulling a vacuum on the tower interior space to urge contaminated liquid into the contaminated liquid inlet and up through the serpentine fluid flow passageway to the clarified liquid outlet; and (k) one or more sources of vibrational energy applied to the separation apparatus.

25. The vacuum assisted solid-liquid separation apparatus of claim 24 further comprising: (l) one or more gas spargers mounted within said serpentine fluid passageway in an area above said one or more solids discharge ports located in said one or more of the downward slope corners for introducing a sparge gas into said serpentine fluid pathway.

26. The vacuum assisted solid-liquid separation apparatus of claim 25 wherein said sparge gas is selected from the group consisting of air, inert gases, carbon dioxide, nitrogen, helium, and combinations thereof.

27. The vacuum assisted solid-liquid separation apparatus of claim 25 wherein the sparge gas is carbon dioxide.

28. The vacuum assisted solid-liquid separation apparatus of claim 24 further comprising: (l) one or more electrocoagulation electrodes housed within said serpentine fluid passageway capable of discharging an electrical current into the fluid, wherein said electrodes are capable of alternating between a positive polarity and a negative polarity and are controlled by process control equipment.

29. The vacuum assisted solid-liquid separation apparatus of claim 24 further comprising a chemical injection port for introducing into said serpentine fluid path one or more desired treatment chemicals.

30. The vacuum assisted solid-liquid separation apparatus of claim 29 wherein said treatment chemical is a coagulant.

31. The vacuum assisted solid-liquid separation apparatus of claim 24 further comprising:
(l) one or more electrocoagulation electrodes housed within said serpentine fluid passageway capable of discharging an electrical current into the fluid, wherein said electrodes are capable of alternating between a positive polarity and a negative polarity and are controlled by process control equipment;
(m) one or more gas spargers mounted within said serpentine fluid passageway in an area above said one or more solids discharge ports located in said one or more of the downward slope corners for introducing a sparge gas into said serpentine fluid pathway; and
(n) a chemical injection port for introducing into said serpentine fluid path one or more desired treatment chemicals.

32. A method of separating contaminated liquids containing solids, water-based liquids, oils and gasses from a mixed phase contaminated slurry comprising the steps of:
(a) directing the contaminated liquids into the inlet of a vacuum assisted solid-liquid separation apparatus for treating contaminated liquids contaminated with undesired solids and gasses, the apparatus comprising:
  i. an enclosed separation tower having an upper end and a lower end opposite thereto, a longitudinal axis oriented substantially vertically through the upper end and the lower end, an outer wall, a top wall connected to the outer wall at the upper end and a bottom wall connected to the outer wall opposite the top wall, the outer wall having an inside surface and an outside surface;
  ii. a tower interior space defined as the space within the outer wall, top wall and bottom wall;
  iii. a contaminated liquids inlet located proximate the vessel lower end for introducing the contaminated liquids into the tower interior space;
  iv. a clarified liquids outlet located above the contaminated liquids inlet for discharging the clarified liquids to a desired location;
  v. a plurality of baffle plates disposed in the tower interior space in a spaced apart relationship, with at least some of the baffle plates being angularly disposed with respect to the longitudinal axis of the separation tower to define a generally serpentine fluid flow passageway,
  vi. the serpentine fluid passageway having a first end in fluid communication with the contaminated liquid inlet, and a second end in fluid communication with the clarified water outlet and the tower interior space proximate the upper end of the tower,
  vii. the angular disposition of the plates creating a series of alternating downwardly and upwardly sloped flow segments within the serpentine first fluid path wherein the contaminated liquid generally flows downwardly in each of the downwardly sloped segments into a downward slope corner and upwardly in the upwardly sloped segment toward an upward slope upper corner;
  viii. one or more solids discharge ports located in one or more of the downward slope corners;
  ix. a standoff conduit, having upper and lower ends, in fluid communication with the one or more solids discharge ports for receiving solids from the contaminated water through the one or more solids discharge ports, the standoff conduit having at its lower end a solids outlet port, and having its upper end in fluid communication with the tower interior space;
  x. one or more upper discharge slots located in one or more of the upward slope upper corners;
  xi. a secondary standoff conduit, having upper and lower ends, in fluid communication with the one or more upper discharge slots for receiving gasses, oils, bubbles and other lighter materials from the contaminated liquids through the one or more upper discharge slots, the secondary standoff conduit having at its lower end a lower outlet for discharging accumulated solids, and having housed within its upper end an upper outlet coupled with a weir for receiving oil and discharging oil out the outlet into discharge tubing, the upper end of the secondary standoff conduit being in fluid communication with the tower interior space;
  xii. a vacuum inlet in fluid communication with the tower interior space and located above the clarified liquid outlet for pulling a vacuum on the tower interior space to urge contaminated liquid into the contaminated liquid inlet and up through the serpentine fluid flow passageway to the clarified liquid outlet; and
  xiii. one or more sources of vibrational energy applied to the separation apparatus;
(b) applying at least one vibrational energy source to the separation apparatus;
(c) applying a vacuum source at the vacuum inlet via the vacuum apparatus;
(d) flowing the solids laden liquids from the inlet upwardly through the generally serpentine fluid flow passageway with the vacuum apparatus to cause undesired solid materials striking the baffle plates to be directed downwardly into the standoff conduit toward the lower end of the separation tower, and gasses, oils and light colloidal or suspended solids to be directed upwardly into the secondary standoff conduit toward the upper end of the separation tower;
(e) removing clarified liquid from the separation tower through the clarified water outlet,
(f) removing undesired gasses out through the vacuum apparatus;
(g) removing undesired solids from the standoff conduit;
(h) removing undesired solids from the secondary standoff conduits; and
(i) removing oils from the secondary standoff conduit.

33. The method of claim 32 wherein the solid-liquid separation apparatus further comprises: one or more electrocoagulation electrodes housed within said serpentine fluid passageway capable of discharging an electrical current into the fluid, wherein said electrodes are capable of alternating between a positive polarity and a negative polarity and are controlled by process control equipment, and said method further comprises the step of introducing a current from said electrodes into said serpentine fluid passageway, and alternating the polarity of said electrodes between positive and negative polarity.

34. The method of claim 32 wherein the solid-liquid separation apparatus further comprises: one or more gas spargers mounted within said serpentine fluid passageway in an area above said one or more solids discharge ports located in said one or more of the downward slope corners for introducing a sparge gas into said serpentine fluid pathway, and said method further comprises the step of introducing said sparge gas into said serpentine fluid pathway.

35. The method of claim 32 wherein the solid-liquid separation apparatus further comprises: a chemical injection port for introducing into said serpentine fluid path one or more desired treatment chemicals, and said method further comprises the step of introducing said one or more chemicals into said serpentine fluid pathway.

36. The method of claim 32 wherein:
the solid-liquid separation apparatus further comprises:
  one or more electrocoagulation electrodes housed within said serpentine fluid passageway capable of discharging an electrical current into the fluid, wherein said electrodes are capable of alternating between a positive polarity and a negative polarity and are controlled by process control equipment,
  one or more gas spargers mounted within said serpentine fluid passageway in an area above said one or more solids discharge ports located in said one or more of the downward slope corners for introducing a sparge gas into said serpentine fluid pathway, and
  a chemical injection port for introducing into said serpentine fluid path one or more desired treatment chemicals,
and wherein said method further comprises the steps of:
  introducing a current from said electrodes into said serpentine fluid passageway, and alternating the polarity of said electrodes between positive and negative polarity,
  introducing said sparge gas into said serpentine fluid pathway, and
  introducing said one or more chemicals into said serpentine fluid pathway.

* * * * *